United States Patent
Else et al.

(10) Patent No.: US 11,776,382 B1
(45) Date of Patent: Oct. 3, 2023

(54) PREMISES SECURITY SYSTEM USING ULTRA-WIDEBAND (UWB) FUNCTIONALITY TO INITIATE AT LEAST ONE ACTION

(71) Applicant: The ADT Security Corporation, Boca Raton, FL (US)

(72) Inventors: Steven Else, Deerfield Beach, FL (US); Jatin Patel, Boca Raton, FL (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/088,333

(22) Filed: Dec. 23, 2022

(51) Int. Cl.
  G08B 25/00 (2006.01)
  H04B 1/7163 (2011.01)

(52) U.S. Cl.
  CPC ......... *G08B 25/008* (2013.01); *H04B 1/7163* (2013.01)

(58) Field of Classification Search
  None
  See application file for complete search history.

(56) References Cited

U.S. PATENT DOCUMENTS

| 9,626,814 | B2 * | 4/2017 | Eyring | G07C 9/00896 |
|---|---|---|---|---|
| 9,633,548 | B2 * | 4/2017 | Sager | G08B 25/10 |
| 9,679,453 | B2 * | 6/2017 | Flint | G08B 13/1672 |
| 9,852,605 | B2 * | 12/2017 | Dey | G08B 25/008 |
| 10,695,007 | B1 * | 6/2020 | Dicks | G16H 40/63 |
| 11,026,067 | B2 * | 6/2021 | Martin | G01S 5/02 |
| 11,084,460 | B2 * | 8/2021 | Breer | B60R 25/245 |
| 11,430,274 | B1 * | 8/2022 | Jakes | G07C 9/28 |
| 2020/0228943 | A1 * | 7/2020 | Martin | H04W 4/80 |
| 2020/0334784 | A1 * | 10/2020 | Borsos | G06N 20/00 |
| 2021/0409896 | A1 * | 12/2021 | Ahn | H04W 88/06 |
| 2022/0301369 | A1 * | 9/2022 | Jakes | H04B 1/7163 |
| 2022/0369103 | A1 * | 11/2022 | Han | H04L 9/0838 |
| 2022/0385333 | A1 * | 12/2022 | Yoon | H04B 1/71637 |
| 2023/0039287 | A1 * | 2/2023 | Bansal | H04W 76/10 |

* cited by examiner

*Primary Examiner* — Carlos Garcia
(74) *Attorney, Agent, or Firm* — Christopher & Weisberg, P.A.

(57) ABSTRACT

A management device for a premises security system that is configured to monitor a premises is provided. The management device includes an ultra-wideband (UWB) transceiver configured to provide a coverage area, and processing circuitry. The processing circuitry is in communication with the UWB transceiver and configured to detect a UWB device within the coverage area, determine a distance of the UWB device from the management device based on signaling received from the UWB transceiver, determine a movement vector of the UWB device based on the signaling received from the UWB transceiver, and initiate a premises security system action based on the distance and the movement vector.

20 Claims, 4 Drawing Sheets

PREMISES SECURITY SYSTEM USING ULTRA-WIDEBAND (UWB) FUNCTIONALITY TO INITIATE AT LEAST ONE ACTION

TECHNICAL FIELD

The present technology is generally related to premises security systems, and in particular, to ultra-wideband (UWB) based functionality for controlling premise security systems.

BACKGROUND

Premises security systems continue to become commonplace in various types of premises such as, for example, residential homes, commercial buildings, etc. These premises security systems often rely on a code, such as a personal identification number (PIN), that is typically programmed into the premises security system at the time of installation. This code can then be used to trigger one or more premises security system functions, such as by inputting the code into a keypad of a control panel at the premises. The premises security system functions include one or more of arm, disarm and/or place the premises security system into one or more other states.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments may reside in combinations of apparatus components and processing steps related to ultra-wideband (UWB) based functionality in a premises security system. Accordingly, components have been represented where appropriate by conventional symbols in the drawings, focusing only on those specific details that facilitate understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes," "including" "has," and "having," when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
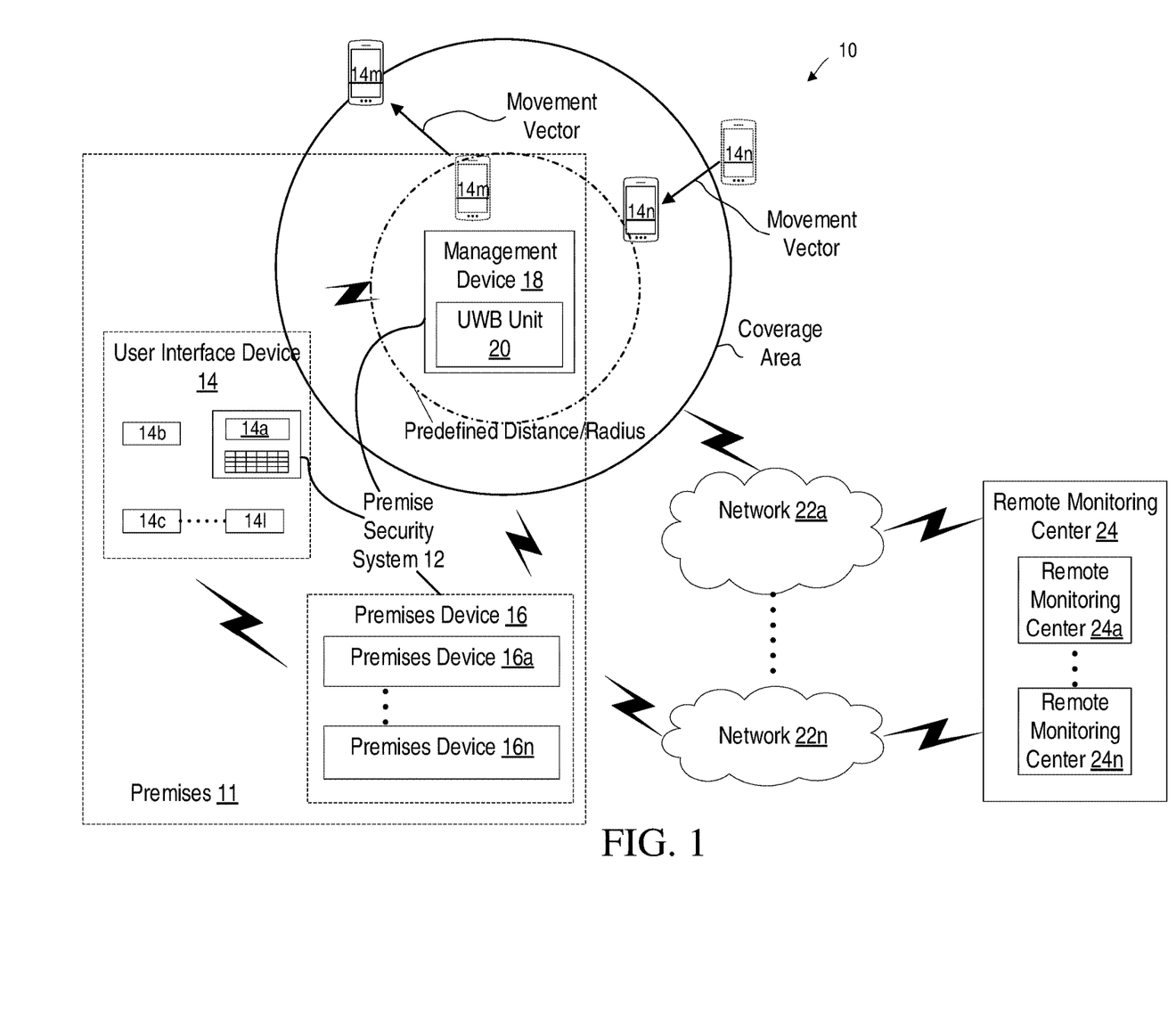
FIG. 1 is a diagram of a system according to some embodiments of the present disclosure.

Referring now to the drawing figures in which like reference designators refer to like elements there is shown in FIG. 1 a system designated generally as "10." System 10 may include premises security system 12 that is configured to monitor premises 11. Premises security system 12 includes and/or is associated with one or more user interface devices 14a to 14n (collectively referred to as "user interface device 14"), one or more premises devices 16a-16n (collectively referred to as "premises device 16") and management device 18. The user interface devices 14, premises device 16, and management device 18 may communicate via one or more wired or wireless communication channels.

Premises device 16a-16n may include sensors, control panels, control devices, images capture devices, life safety devices, lifestyle devices and/or other devices. For example, the types of sensors may include various life safety related sensors such as motion sensors, fire sensors, carbon monoxide sensors, flooding sensors and contact sensors, among other sensor types. The control devices may include, for example, one or more lifestyle related devices configured to adjust at least one premises setting such as lighting, temperature, energy usage, door lock and power settings, among other settings associated with the premises or devices on the premises. Image capture devices may include digital cameras and/or video cameras, among other image capture devices.

Management device 18, which may be, for example, a security system base station that is configured to manage and/or control one or more premises security system actions and/or functions. Management device 18 may include an ultra-wideband (UWB) unit 20 for performing one or more UWB based functions as described herein such as, for example, changing a state of the premises security system 12 based on UWB data associated with a UWB device (e.g., user interface device 14 such as a wireless mobile phone). For example, management device 18 may provide a coverage area (e.g., UWB coverage area) for monitoring user interface devices 14 and/or other devices having UWB capability (i.e., UWB devices), as described herein. For example, the monitoring may indicate one or more movement vectors and/or distances associated with one or more user interface devices 14. Hence, one or more embodiments use the UWB capability of wireless mobile phones to determine if the user of the mobile phone is approaching the doorway of the premises 11 and authenticate the user to automatically disarm a premises security system 12 without any user intervention. In one or more embodiments, security control panel 14a may include UWB unit 20 for performing one or more UWB based functions as described herein such as, for example, changing a state of the premises security system 12 based on UWB data associated with a UWB device (e.g., associated with user interface device 14 such as a wireless mobile phone).

System 10 may further include one or more networks 22a to 22n (collectively referred to as "network 22"), and one or more remote monitoring centers 24a to 24n (collectively referred to as "remote monitoring center 24"), communicating with each other or with at least one other entity in system 10.

User interface device 14 may be a wireless device (e.g., wireless mobile device) that allows a user to communicate and/or exchange signaling with management device 18. User interface device 14 may be a security control panel 14a (e.g., portable control keypad/interface 14a), computer 14b, laptop 14c, wireless mobile phone 14m and 14n, among other devices that allow a user to interface with management device 18 and/or one or more premises devices 16. In particular, wireless mobile devices 14m and 14n are preconfigured with UWB capability, although the teaches described herein equally applicable to other mobile devices that have UWB capability.

User interface device 14 may communicate at least with management device 18 using one or more wired and/or wireless communication protocols. For example, portable control keypad 12a may communicate with control device 15 via a ZigBee based communication link, e.g., network based on Institute of Electrical and Electronics Engineers (IEEE) 802.15.4 protocols, and/or Z-wave based communication link, or over the premises' local area network, e.g., network-based on Institute of Electrical and Electronics Engineers (IEEE) 802.11 protocols, user interface device 14. In one or more embodiments, wireless mobile device 14m may communicate with management device 18 using a first wireless protocol such as ZigBee or Z-wave, and may also communicate/signal with management device 18 using its UWB capability for monitoring purposes as described herein. Alternatively, wireless mobile device 14 may use its UWB capability to communicate with management device 18 while also allowing for UWB based monitoring.

The premises devices 16 may communicate with management device 18 via proprietary wireless communication protocols and may also use Wi-Fi. Other communication technologies can also be used, and the use of Wi-Fi is merely an example.

Management device 18 may provide one or more of management functions, monitoring functions (e.g., UWB based monitoring), analysis functions, control functions, premises device management and alarm management and/or analysis, among other functions associated with premises security system 12. For example, management device 18 may manage one or more life safety and lifestyle features. Life safety features may correspond to security system functions and settings associated with premises conditions that may result in life threatening harm to a person, such as carbon monoxide detection and intrusion detection. Lifestyle features may correspond to security system functions and settings associated with video capturing devices and non-life-threatening conditions of the premises, such as lighting and thermostat functions.

Management device 18 may communicate with network 22 via one or more communication links. In particular, the communications links may be broadband communication links, such as a wired cable modem or Ethernet communication link, and digital cellular communication link, e.g., long term evolution (LTE) and/or 5G based link, among other broadband communication links. Broadband as used herein may refer to a communication link other than a plain old telephone service (POTS) line. Ethernet communication link may be an IEEE 802.3 or 802.11 based communication link. Network 22 may be a wide area network, local area network, wireless local network and metropolitan area network, among other networks. Network 22 provides communications among one or more of management device 18, remote monitoring center 24 and premises device 16.

Figure 2:
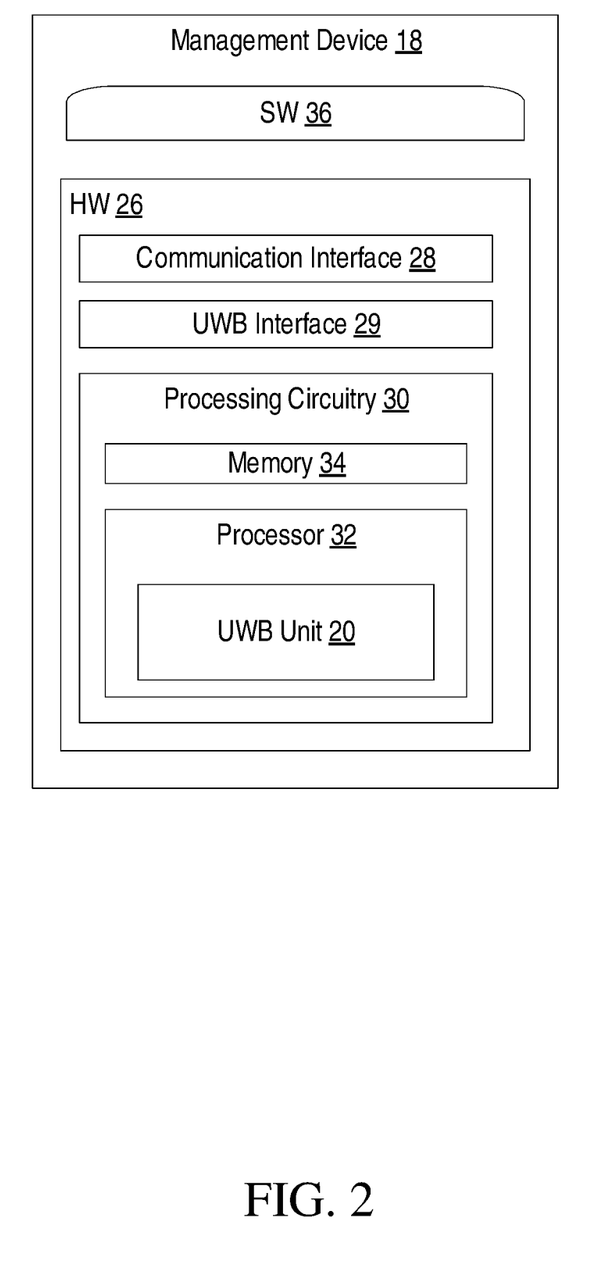
FIG. 2 is a block diagram of an example management device according to some embodiments of the present disclosure.

With respect to FIG. 2, the example system 10 includes a management device 18 that includes hardware 26 enabling the management device 18 to communicate and/or signal with one or more entities in system 10 and to perform one or more functions described herein.

The hardware 26 may include a communication interface 28 for setting up and maintaining at least a wired and/or wireless connection to one or more entities in system 10 such as remote monitoring center 24, a premises device 16, user interface device 14, another control device 15, etc. The hardware 26 may include UWB interface 29 for communicating and/or signaling with user interface device 14 and/or other devices with UWB capability. For example, UWB interface 29 may include a UWB transceiver or UWB transmitter and receiver for communicating/signaling within a coverage area of the UWB interface 29.

In the embodiment shown, the hardware 26 of the management device 18 further includes processing circuitry 30. The processing circuitry 30 may include a processor 32 and a memory 34. In particular, in addition to or instead of a processor, such as a central processing unit, and memory, the processing circuitry 30 may comprise integrated circuitry for processing and/or control, e.g., one or more processors, processor cores, field programmable gate arrays (FPGAs), and/or application specific integrated circuits (ASICs) adapted to execute instructions. The processor 32 may be configured to access (e.g., write to and/or read from) the memory 34, which may comprise any kind of volatile and/or nonvolatile memory, e.g., cache, buffer memory, random access memory (RAM), read-only memory (ROM), optical memory, and/or erasable programmable read-only memory (EPROM).

Thus, the management device 18 further has software 36 stored internally in, for example, memory 34, or stored in external memory (e.g., database, storage array, network storage device, etc.) accessible by the management device 18 via an external connection. The software 36 may be executable by the processing circuitry 30. The processing circuitry 30 may be configured to control any of the methods and/or processes described herein and/or to cause such methods, and/or processes to be performed, e.g., by management device 18. Processor 32 corresponds to one or more processors 32 for performing management device 18 functions described herein. The memory 34 is configured to store data, programmatic software code and/or other information described herein. In some embodiments, the software 36 may include instructions that, when executed by the processor 32 and/or processing circuitry 30, cause the processor 32 and/or processing circuitry 30 to perform the processes described herein with respect to management device 18. For example, processing circuitry 30 of the management device 18 may include UWB unit 20, which is configured to perform one or functions described herein such as with respect to, for example, detecting and monitoring one or more UWB devices 14 (e.g., user interface devices 14 having UWB capability), as described herein.

Although FIGS. 1 and 2 show UWB unit 20 as being within a respective processor, this unit may be implemented such that a portion of the unit is stored in a corresponding memory within the processing circuitry. In other words, the unit may be implemented in hardware or in a combination of hardware and software within the processing circuitry. Further, in one or more embodiments, UWB unit 20 and UWB interface 29 may be included in another entity of premises security system 12 such as control panel 14a.

Figure 3:
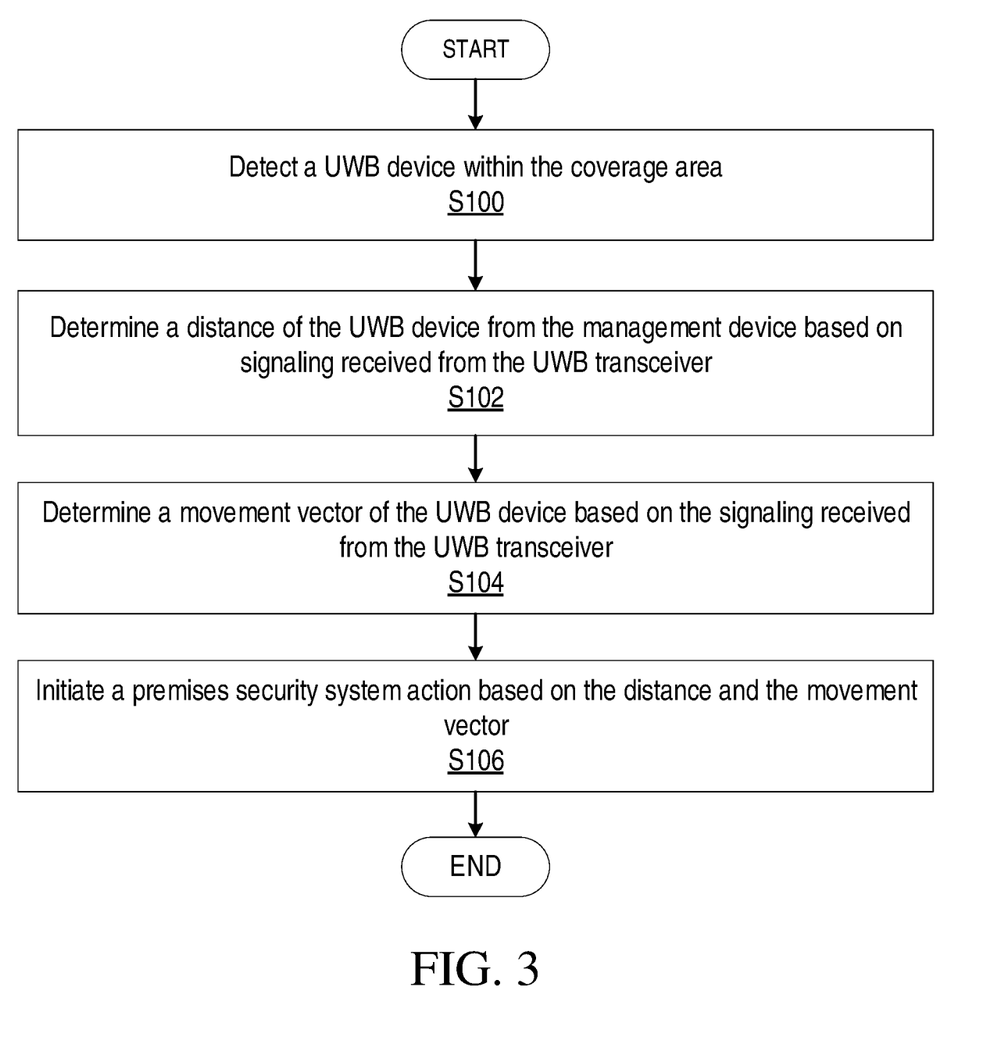
FIG. 3 is a flowchart of an example process according to some embodiments of the present disclosure.

FIG. 3 is a flowchart of an example process implemented by a management device 18 according to one or more embodiments of the present disclosure. One or more blocks described herein may be performed by one or more elements of management device 18, such as by one or more of hardware 26, UWB interface 29 (including UWB transceiver that is configured to provide a coverage area), processing circuitry 30 (including the UWB unit 20), processor 32, memory 34, etc. Management device 18 is configured to detect (Block S100) a UWB device 14 within the coverage area, as described herein. Management device 18 is configured to determine (Block S102) a distance of the UWB device 14 from the management device 18 based on signaling received from the UWB transceiver, as described herein. The signaling may include packets (challenge/polling packets and/or response packets) received by the management device 18. Management device 18 is configured to determine (Block S104) a movement vector of the UWB device 14 based on the signaling received from the UWB transceiver, as described herein. Management device 18 is configured to initiate (Block S106) a premises security system action based on the distance and the movement vector, as described herein.

According to one or more embodiments, the processing circuitry 30 is further configured to determine a plurality of movement vectors of the UWB device 14 based on the signaling received from the UWB transceiver while the UWB device 14 is within the coverage area. According to one or more embodiments, the processing circuitry 30 is further configured to disarm the premises security system 12 in response to determining that the plurality of movement vectors indicate the UWB device 14 is moving towards the premises 11, and arm the premises security system 12 in response to determining that the plurality of movement vectors indicate the UWB device 14 is moving away from the premises 11.

According to one or more embodiments, the processing circuitry 30 is further configured to: determine a plurality of distances of the UWB device 14 at a plurality of respective time instances, and initiate the premises security system action based on at least one of the plurality of distances of the UWB device 14 meeting a predefined distance threshold. According to one or more embodiments, the premises security system action is associated with a predefined motion indicated by a plurality of successive movement vectors. According to one or more embodiments, the predefined motion is one of toward or away from the premises 11.

According to one or more embodiments, the predefined motion comprises motion in a predefined direction relative to the management device 18. According to one or more embodiments, the predefined motion is indicated by: one of the at least two successive movement vectors failing to meet a predefined distance threshold, and another one of the at least two successive movement vectors meeting the predefined distance threshold. According to one or more embodiments, each of the at least two successive movement vectors meet at least one predefined distance threshold. According to one or more embodiments, the processing circuitry 30 is further configured to determine time of flight values between the management device 18 and UWB device 14 based on measurements of the received signaling, and the distance and movement vector of the UWB device 14 is based on the time of flight values. In one or more embodiments, time of flight values may correspond to a loop time at a polling device (e.g., management device 18) minus a reply time, where the result is divided by 2. The reply time may correspond to the amount of time between receiving the poll/signaling and responding to the poll. The loop time may correspond to the amount of time between sending the poll/signaling and receiving the response.

Having described the general process flow of arrangements of the disclosure and having provided examples of hardware and software arrangements for implementing the processes and functions of the disclosure, the sections below provide details and examples of arrangements for UWB based functionality for controlling the premise security system.

In various embodiments, UWB capability can be used to disarm a premises security system 12. To this end, during the setup of the premises security system 12 or at another time after the premises security system 12 has been setup, a user may pair the user's UWB compatible smart phone (e.g., UWB device 14) with the UWB compatible premises security system 12, such as via the management device 18. Next, the user acknowledges and accepts to use UWB device 14 to disarm the premises security system 12. Premises security system 12 allows the user to select a proximity distance (e.g., 10 feet, 15 feet, 25 feet, etc.) from one of management device 18, security control panel 14 or premises 11 that the user would like the premises security system 12 to automatically disarm.

Figure 4:
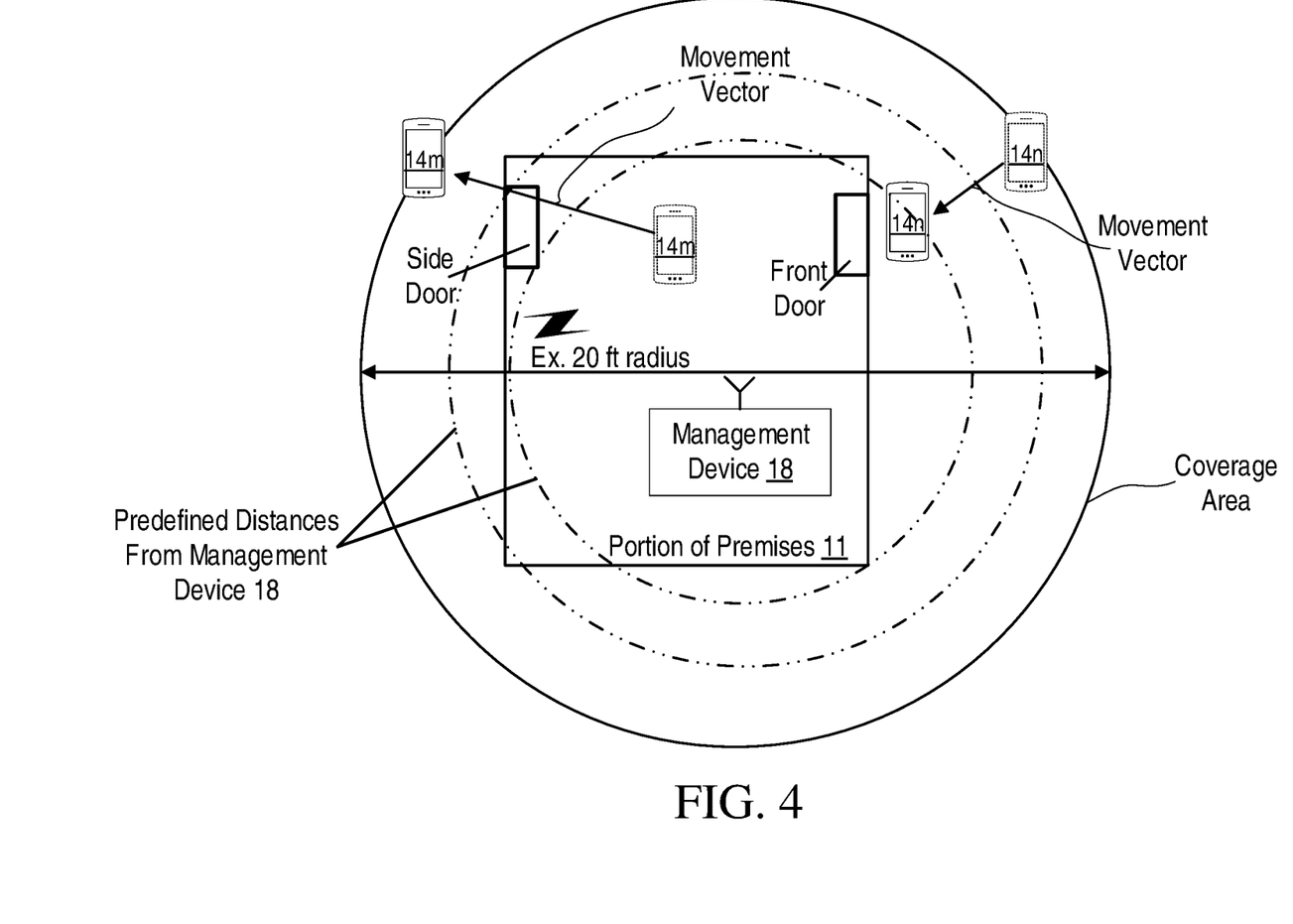
FIG. 4 is a diagram of an example according to some embodiments of the present disclosure.

During the arm state of the premises security system 12, once the user is returning to the premises 11 with UWB device 14n as illustrated in FIG. 4, the following process occurs. First, the user's UWB device 14n comes in the range of premises security system 12, i.e. UWB device 14n is detected within the coverage area of UWB transceiver of management device 18. In one or more embodiments, management device 18 may authenticate the detected UWB device 14n. From then on, premises security system 12, via management device 18, will monitor the location of the UWB device 14n as long as the UWB device 14n is within the coverage area and calculate movement vectors for the UWB device 14n.

For example, movement vectors of UWB device 14 are determined by using time-of-flight measurement(s) between two or more UWB device 14 such as UWB device 14n and management device 18 or between UWB device 14n and user interface device 14a (w/UWB functionality, UWB unit 20). The measurements are performed based on the round trip time of challenge/response packets. In the case of the security control panel 14a with UWB functionality, the security control panel 14a acts as a fixed UWB anchor that calculates the precise location of the UWB device 14n. UWB device 14n may be one of a mobile phone, wristwatch, UWB enabled car, etc. By determining the relative motion and position, a UWB enabled security system is able to determine the user location internal or external to the premises 11. This allows precision tracking of movements such as toward a door or window, and/or along a predefined path.

If UWB device 14*n* has continuous movement towards the front door of premises 11 where premises security system 12 is located, then premises security system 12 will determine that the user (i.e., UWB 14*n*) is approaching the front door. Continuous movement or motion of the UWB device 14 may be determined based on a plurality of successive movement vectors determined by management device 18 using data received from UWB transceiver. For example, management device 18 may expect continuous movement along the pathway from the driveway to the door where such movement may correspond to movement in a predefined direction relative to the premises 11 (or management device 18) followed by movement toward premises 11 (or management device 18), which may be determined by successive movement vectors. If the user approaches within a pre-determined distance from the security control panel 14*a* or management device 18, then the premises security system 12 will automatically disarm.

Additionally, in various embodiments, UWB capability can be used to arm a premises security system 12. For example, during the disarm state of the premises security system 12, once the user is leaving premises 11 with UWB device 14*m* as illustrated in FIG. 4, the premises security system 12, via management device 18, monitors the location of the UWB device 14*m* since UWB device 14*m* is within the coverage area of UWB transceiver.

If UWB device 14*n* has continuous movement from inside premises 11 to outside the side door of premises 11, then premises security system 12 will determine that the user (i.e., UWB 14*m*) may be leaving premises 11 via the side door. Continuous movement or motion of the UWB device 14*m* may be determined based on a plurality of successive movement vectors determined by management device 18 using data received from UWB transceiver. For example, the successive movement vectors may indicate that UWB device 14*m* is leaving the premises via a side door instead of a front door. In one or more embodiments, the successive movement vectors are analyzed to determine if they correspond to a plurality of predefined successive movement vectors indicating UWB device 14 traversed a specific predefined path to or from premises 11. For example, successive movement vectors indicating UWB 14 is moving away from premises 11 but towards the driveway may trigger a different premises security system action than successive movement vectors indicating UWB 14 is moving away from premises 11 and away from the driveway. That is, a different plurality of successive movement vectors and/or UWB device 14 distances may correspond to different premises security system actions.

If the user (i.e., UWB device 14*m*) is determined to be a pre-determined distance away from the security panel or management device 18 and/or if the UWB device 14*m* is no longer detectable (i.e., no longer within the coverage area), then the premises security system 12 will automatically arm as the user left the premises. Upon returning, the process may follow the process discussed above regarding disarming the premises security system 12.

As illustrated in FIG. 4, management device 18 may be configured with one or more predefined detection distances for detecting UWB device 14. In particular, signaling (a radio frequency pulses) communicated between UWB device 14*n* and management device 18 may be omnidirectional. The UWB device 14*n* sends data packets to management device 18 such that management device 18 is able to measure the round trip time between each data packet sent by UWB device 14*n*. Management device 18 then maps x, y, z coordinates of UWB device 14*n* based on time-of-flight values.

Therefore, one or more embodiments described herein provide for configurable premises security system actions based on UWB monitoring performed by the premises security system 12. While the examples described above described above relate to arming/disarming functions of the premises security system 12, other premises security system actions may be implemented/triggered based the UWB monitoring such as, for example, triggering one or more premises 11 lifestyle devices 14 (e.g., interior lights, door lock, etc.) and/or life safety devices 14 (e.g., exterior lights). Further, each premises security system action may be associated/triggered by one or more predefined movement vectors and/or one or more predefined distance thresholds being met, thereby allowing for highly configurable premises security system 12 actions.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present disclosure is not limited to what has been particularly shown and described herein above. In addition, unless mention was made above to the contrary, it all of the accompanying drawings are not to scale. A variety of modifications and variations are possible in light of the above teachings without departing from the scope and spirit of the disclosure.

What is claimed is:

1. A management device for a premises security system that is configured to monitor a premises, the management device comprising:
    an ultra-wideband (UWB) transceiver configured to provide with a coverage area;
    processing circuitry in communication with the UWB transceiver, the processing circuitry configured to:
        detect a UWB device within the coverage area;
        while the UWB device is detectable within the coverage area:
            determine a plurality of distances of the UWB device from the management device based on UWB signaling received by the UWB transceiver;
            determine a plurality of successive movement vectors of the UWB device based on the UWB signaling each of the plurality of successive movement vectors being associated with a respective one of the plurality of distances;
        compare the plurality of distances and the plurality of successive movement vectors with a predefined plurality of distances and a predefined plurality of successive movement vectors, each of the predefined plurality of distances being associated with a respective one of the predefined plurality of successive movement vectors, the predefined plurality of successive movement vectors including at least two predefined movement vectors in different directions; and
        initiate a premises security system action based on the comparison.

2. The management device of claim 1, wherein the processing circuitry is further configured to disarm the premises security system in response to the comparison that indicates the UWB device is moving along a predefined path that leads towards the premises.

3. The management device of claim 2, wherein the processing circuitry is further configured to:
    arm the premises security system in response to comparison that indicates the UWB device is moving along a predefined path that leads away from the premises.

4. The management device of claim 1, wherein the processing circuitry is further configured to:
    determine a plurality of time instances, each of the plurality of time instances being associated with a respective one of the plurality of distances and the plurality of successive movement vectors; and
    the initiating of the premises security system action being based on at least one of the plurality of distances of the UWB device meeting a predefined distance threshold.

5. The management device of claim 1, wherein the premises security system action is associated with at least one predefined motion indicated by the plurality of successive movement vectors.

6. The management device of claim 5, wherein the premises security system action is associated with the at least one predefined motion that is one of toward or away from the premises.

7. The management device of claim 5, wherein the at least one predefined motion comprises at least one motion in at least one predefined direction relative to the management device.

8. The management device of claim 5, wherein each of a plurality of premises security system actions is associated with a respective plurality of predefined movement vectors.

9. The management device of claim 1, wherein the initiating of the premises security action is based on:
    one of the plurality of successive movement vectors failing to meet a predefined distance threshold; and
    another one of the plurality of successive movement vectors meeting the predefined distance threshold.

10. The management device of claim 1, wherein the processing circuitry is further configured to determine time of flight values between the management device and UWB device based on measurements of the received UWB signaling; and
    the plurality of distances and the plurality of successive movement vectors being based on the time of flight values.

11. A method implemented by a management device for a premises security system that is configured to monitor a premises, the management device comprising an ultra-wideband (UWB) transceiver configured with a coverage area, the method comprising:

detecting a UWB device within the coverage area;
while the UWB device is detectable within the coverage area:
   determining a plurality of distances of the UWB device from the management device based on UWB signaling received by the UWB transceiver;
   determining a plurality of successive movement vectors of the UWB device based on the UWB signaling each of the plurality of successive movement vectors being associated with a respective one of the plurality of distances;
comparing the plurality of distances and the plurality of successive movement vectors with a predefined plurality of distances and a predefined plurality of movement vectors, each of the predefined plurality of distances being associated with a respective one of the plurality of successive movement vectors, the predefined plurality of successive movement vectors including at least two predefined movement vectors in different directions; and
initiating a premises security system action based on the comparison.

12. The method of claim 11, further comprising disarming the premises security system in response to the comparison that indicates the UWB device is moving along a predefined path that leads towards the premises.

13. The method of claim 12, further comprising:
arming the premises security system in response to comparison that indicates the UWB device is moving along a predefined path that leads away from the premises.

14. The method of claim 11, further comprising:
determining a plurality of time instances, each of the plurality of time instances being associated with a respective one of the plurality of distances and the plurality of successive movement vectors; and
the initiating of the premises security system action being based on at least one of the plurality of distances of the UWB device meeting a predefined distance threshold.

15. The method of claim 11, wherein the premises security system action is associated with at least one predefined motion indicated by the plurality of successive movement vectors.

16. The method of claim 15, wherein the premises security system action is associated with the at least one predefined motion that is one of toward or away from the premises.

17. The method of claim 15, wherein the at least one predefined motion comprises at least one motion in at least one predefined direction relative to the management device.

18. The method of claim 15, wherein each of the a plurality of premises security system actions is associated with a respective plurality of predefined successive movement vectors.

19. The method of claim 1, wherein the initiating of the premises security action is based on:
one of the plurality of successive movement vectors failing to meet a predefined distance threshold; and
another one of the plurality of successive movement vectors meeting the predefined distance threshold.

20. The method of claim 11, further comprising determining time of flight values between the management device and UWB device based on measurements of the received UWB signaling; and
the plurality of distances and the plurality of successive movement vectors being based on the time of flight values.

* * * * *